(12) United States Patent
Tomoe

(10) Patent No.: US 11,078,576 B2
(45) Date of Patent: Aug. 3, 2021

(54) CORROSION INHIBITOR, WELL, PIPELINE, AND METHOD FOR FORMING ANTICORROSION FILM

(71) Applicants: INPEX CORPORATION, Tokyo (JP); Japan Oil, Gas and Metals National Corporation, Tokyo (JP)

(72) Inventor: Yasuyoshi Tomoe, Yokohama (JP)

(73) Assignees: INPEX CORPORATION, Tokyo (JP); Japan Oil, Gas and Metals National Corporation, Tokyo (JP)

( * ) Notice: Subject to any disclaimer, the term of this patent is extended or adjusted under 35 U.S.C. 154(b) by 0 days.

(21) Appl. No.: 16/326,879

(22) PCT Filed: Aug. 22, 2017

(86) PCT No.: PCT/JP2017/029924
§ 371 (c)(1),
(2) Date: Feb. 20, 2019

(87) PCT Pub. No.: WO2018/038099
PCT Pub. Date: Mar. 1, 2018

(65) Prior Publication Data
US 2019/0203361 A1 Jul. 4, 2019

(30) Foreign Application Priority Data

Aug. 23, 2016 (JP) .............................. JP2016-162848

(51) Int. Cl.
*E21B 17/10* (2006.01)
*C23F 11/10* (2006.01)
(Continued)

(52) U.S. Cl.
CPC ................ *C23F 11/10* (2013.01); *C09K 8/54* (2013.01); *E21B 17/1007* (2013.01); *F16L 58/04* (2013.01)

(58) Field of Classification Search
CPC ...... E21B 17/1007; C23F 11/10; F16L 58/04; C09K 8/54
See application file for complete search history.

(56) References Cited

U.S. PATENT DOCUMENTS 3,350,408 A * 10/1967 Hodgson .............. C07D 333/08
549/28
3,457,185 A * 7/1969 Tippett .................... C23F 11/04
252/391
(Continued)

FOREIGN PATENT DOCUMENTS

EP 0275646 A1 7/1988
EP 0275651 A1 7/1988
(Continued)

OTHER PUBLICATIONS

International Search Report dated Sep. 26, 2017 in International Patent Application No. PCT/JP2017/029924, 4 pages.

*Primary Examiner* — Daniel P Stephenson
(74) *Attorney, Agent, or Firm* — Shook, Hardy & Bacon LLP

(57) ABSTRACT

This corrosion inhibitor can satisfactorily prevent corrosion of the inner surface of a well or pipeline, and contains an inhibitor (A) having a hydrophobic group and a polar group capable of donating an electron pair to a metal surface, an aromatic solvent (B), and hydrophobic nanoparticles (C).

10 Claims, 10 Drawing Sheets

(51) Int. Cl.
    *F16L 58/04*     (2006.01)
    *C09K 8/54*     (2006.01)

(56) References Cited

U.S. PATENT DOCUMENTS

| | | | | |
|---|---|---|---|---|
| 3,791,789 | A | * | 2/1974 | Oude Alink .......... C23F 11/165 422/12 |
| 3,959,313 | A | * | 5/1976 | Alink .................. C07D 339/04 549/36 |
| 4,339,349 | A | * | 7/1982 | Martin .................... C09K 8/54 507/238 |
| 4,435,361 | A | * | 3/1984 | DaGue .................... C09K 8/54 106/14.13 |
| 2008/0187767 | A1 | | 8/2008 | Tang et al. |
| 2016/0376492 | A1 | * | 12/2016 | Chakraborty ........... E21B 43/16 166/267 |
| 2017/0355902 | A1 | * | 12/2017 | Moloney ............. F16L 58/1009 |
| 2019/0203361 | A1 | * | 7/2019 | Tomoe .................... C09K 8/54 |

FOREIGN PATENT DOCUMENTS

| | | |
|---|---|---|
| JP | 63-183183 A | 7/1988 |
| JP | 63-183184 A | 7/1988 |
| JP | 2000-219980 A | 8/2000 |
| JP | 2001-081188 A | 3/2001 |
| JP | 2001-131779 A | 5/2001 |
| JP | 2008-127275 A | 6/2008 |

* cited by examiner

CORROSION INHIBITOR, WELL, PIPELINE, AND METHOD FOR FORMING ANTICORROSION FILM

CROSS-REFERENCE TO RELATED APPLICATIONS

This application is a 35 U.S.C. § 371 national stage application of PCT Application Number PCT/JP2017/029924, filed Aug. 22, 2017, which claims the benefit of priority of Japanese Patent Application No. 2016-162848, filed Aug. 23, 2016, the contents of which are incorporated by reference herein.

TECHNICAL FIELD

The present invention relates to a corrosion inhibitor, a well, a pipeline, and a method for forming an anticorrosion film.

BACKGROUND ART

In production wells such as oil fields that produce petroleum and gas fields that produce natural gas, the material used for the oil extraction tubing (tubing) that is installed inside the casing for guiding the petroleum or natural gas from the oil layer or gas layer to the surface is mainly carbon steel or stainless steel. Further, the material used for the transport piping of pipelines built for transporting petroleum or natural gas from the production well to processing facilities or delivery terminals typically employs the same type of carbon steel or stainless steel as the above tubing.

The crude oil or natural gas extracted from below ground contains moisture, together with corrosive gases such as carbon dioxide and hydrogen sulfide. Accordingly, corrosion of the inner surfaces of the oil extraction tubing in production wells and the transport piping in pipelines by these moist corrosive gases must be taken into consideration.

Japanese Unexamined Patent Application, First Publication No. 2000-219980 discloses one example of a method for preventing metal corrosion by adding an organic inhibitor such as a long-chain fatty acid and a hydrocarbon oil such as an aromatic hydrocarbon to suppress localized corrosion of metals.

CITATION LIST

Patent Documents

Japanese Unexamined Patent Application, First Publication No. 2000-219980

SUMMARY OF INVENTION

Problems to be Solved by the Invention

However, the method disclosed in Japanese Unexamined Patent Application, First Publication No. 2000-219980 does not necessarily produce satisfactory corrosion prevention.

The present invention has been developed in light of the above circumstances, and has an object of providing a corrosion inhibitor that can satisfactorily prevent corrosion of the inner surfaces of the oil extraction tubing in production wells and the transport piping in pipelines, as well as providing a well, a pipeline, and a method for forming an anticorrosion film that uses the corrosion inhibitor.

Means for Solving the Problems

The present invention has the following aspects.

[1] A corrosion inhibitor containing an inhibitor (A) having a hydrophobic group and a polar group capable of donating an electron pair to a metal surface, an aromatic solvent (B), and hydrophobic nanoparticles (C).

[2] The corrosion inhibitor according to [1], wherein the boiling point of the aromatic solvent (B) is from 60 to 200° C.

[3] The corrosion inhibitor according to [1] or [2], wherein the hydrophobic nanoparticles (C) are carbon nanotubes.

[4] The corrosion inhibitor according to [3], wherein the carbon nanotubes are cup-stacked carbon nanotubes.

[5] A well containing tubing having an anticorrosion film formed on the inner surface of the tubing by the corrosion inhibitor according to any one of [1] to [4]. In the present description, the term "well" is not limited to production wells of oil fields or gas fields or the like, and includes other facilities having piping for which corrosion of the inner surfaces by corrosive gases may be a concern, such as injection wells used for injecting gas or water underground, and observation wells used for observing the state of underground structures during the production of crude oil or natural gas.

[6] A pipeline containing transport piping having an anticorrosion film formed on the inner surface of the transport piping by the corrosion inhibitor according to any one of [1] to [4]. In the present description, a "pipeline" is a piece of equipment for transporting extracted fossil fuels such as petroleum and natural gas, and does not indicate merely a simple assembly of pipes.

[7] A method for forming an anticorrosion film includes forming an anticorrosion film on the inner surface of a pipe by adding the corrosion inhibitor according to any one of [1] to [4] to a hydrocarbon oil or production fluid inside the pipe. In the present description, the term "hydrocarbon oil" includes extracted crude oil, and the term "production fluid" includes extracted natural gas or underground water, as well as corrosive gases such as carbon dioxide and hydrogen sulfide.

[8] The method for forming an anticorrosion film according to [7], wherein the pipe is tubing installed in a well, or transport piping in a pipeline.

Effects of the Invention

The corrosion inhibitor of the present invention can satisfactorily prevent corrosion of members having inner surfaces that are exposed to moist corrosive gases, such as the oil extraction tubing in production wells and the transport piping in pipelines.

Further, a well or pipeline of the present invention has oil extraction tubing or transport piping with an inner surface that is resistant to corrosion.

Accordingly, the service life of the oil extraction tubing or transport piping can be extended, enabling operational costs for the equipment to be reduced.

DESCRIPTION OF EMBODIMENTS

Figure 1:
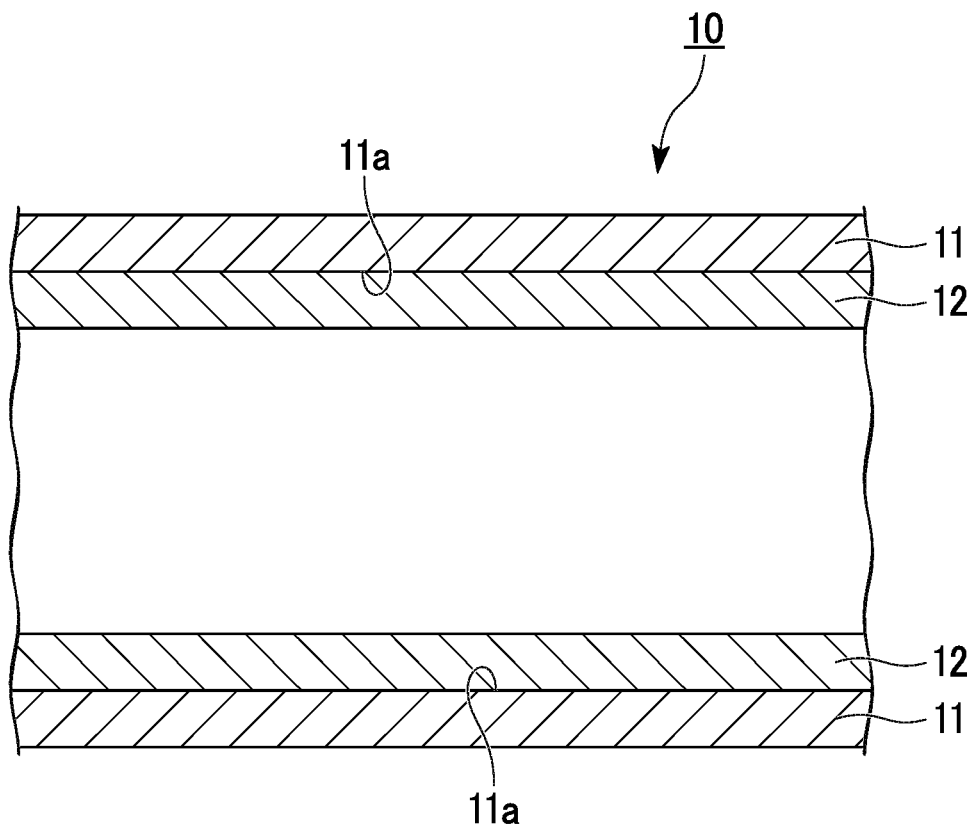
FIG. 1 is a cross-sectional view schematically illustrating one example of oil extraction tubing contained in a well of the present invention.

Examples of embodiments of the present invention are described below in detail, but the present invention should in no way be considered as being limited by these embodiments.

[Corrosion Inhibitor]

A corrosion inhibitor of an embodiment of the present invention contains an inhibitor (A) (hereafter also referred to as "component (A)") having a hydrophobic group and a polar group capable of donating an electron pair to a metal surface, an aromatic solvent (B) (hereafter also referred to as "component (B)"), and hydrophobic nanoparticles (C) (hereafter also referred to as "component (C)").

Each of these components is described below.

<Component (A)>

The component (A) is an inhibitor having a hydrophobic group, and a polar group capable of donating an electron pair to a metal surface.

Examples of the hydrophobic group include alkyl groups of 6 to 20 carbon atoms and alkenyl groups of 6 to 20 carbon atoms.

Examples of the polar group capable of donating an electron pair to a metal surface include groups containing an element from group 15 or group 16 of the periodic table such as nitrogen (N), phosphorus (P), oxygen (O) or sulfur (S), and specific examples of the polar group include a carboxyl group and salts thereof, a hydroxyl group, groups having a basic nitrogen (for example, an amino group or the like) and salts thereof, a sulfonic acid group and salts thereof, and a phosphoric acid group and salts thereof. Examples of the salts include alkali metal salts and alkaline earth metal salts.

The number of polar groups may be either one, or two or more, within a single molecule. In those cases where the component (A) has two or more polar groups, the polar groups may be of the same type, or different types.

The component (A) adsorbs to the metal surface when the polar group donates an electron pair to a metal, thus forming a layer (coating film). This type of component (A) is also called an "adsorption inhibitor" or a "filming amine".

Specific examples of the component (A) include sodium N-dodecanoylsarcosinate, dodecylamine, stearic acid, and oleic imidazoline.

Further, a commercially available product may also be used as the component (A), and examples include products manufactured by Nalco Champion Co., Ltd., including a water-soluble inhibitor (product name: EC1304A), and an oil-soluble, water-dispersible inhibitor (product name: EC1103A).

A single component (A) may be used alone, or a combination of two or more components may be used.

<Component (B)>

The component (B) is an aromatic solvent. Aromatic solvents are able to disperse the component (C) described below more readily than other solvents.

Examples of the component (B) include monocyclic aromatic hydrocarbons having one aromatic ring per molecule, and polycyclic aromatic hydrocarbons having two or more aromatic rings per molecule. In terms of achieving favorable compatibility with the component (A), enabling good dispersion of the component (C), and making it easier to better realize the effect (corrosion prevention) of the present embodiment, a monocyclic aromatic hydrocarbon is preferred, and a monocyclic aromatic hydrocarbon having a boiling point of 60 to 200° C. is particularly preferred. The boiling point of the monocyclic aromatic hydrocarbon is more preferably from 70 to 180° C., and even more preferably from 80 to 150° C. On the other hand, in the case of use of the corrosion inhibitor under higher temperature conditions (for example, at temperatures exceeding 100° C.) (in other words, during use of the corrosion inhibitor in an environment where the oil extraction tubing of the production well or the transport piping of the pipeline is exposed to high temperatures), in terms of making it easier to better realize the effect (corrosion prevention) of the present embodiment, a polycyclic aromatic hydrocarbon is preferably used as the component (B), and the use of a polycyclic aromatic hydrocarbon in combination with dodecylamine, stearic acid or an amine-based compound such as oleic imidazoline as the component (A) is particularly preferred.

Examples of the monocyclic aromatic hydrocarbon include benzene (boiling point: 80.1° C.), toluene (boiling point: 110.6° C.), xylene (boiling point: 138 to 144° C.) and ethylbenzene (boiling point: 136° C.). One of these monocyclic aromatic hydrocarbons may be used alone, or a combination of two or more compounds may be used.

Examples of the polycyclic aromatic hydrocarbon include Solvesso 100, Solvesso 150, and Solvesso 200 and the like, manufactured by Exxon Mobil Corporation. One of these polycyclic aromatic hydrocarbons may be used alone, or a combination of two or more compounds may be used.

The amount of the component (B) in the corrosion inhibitor is preferably from 400 to 3,500 parts by mass, and more preferably from 800 to 2,800 parts by mass, per 100 parts by mass of the pure component of the component (A). Provided the amount of the component (B) is at least 400 parts by mass, an improvement in the corrosion prevention effect can be achieved as a result of the addition of the component (B). The corrosion prevention effect tends to improve as the amount of the component (B) is increased, but the effect plateaus once the amount is increased beyond 3,500 parts by mass. If consideration is given to achieving a balance between the corrosion prevention effect and the production costs, then the amount of the component (B) is preferably not more than 3,500 parts by mass.

<Component (C)>

The component (C) is hydrophobic nanoparticles.

Examples of the component (C) include carbon nanotubes, carbon black, graphene, and silica nanoparticles. Although described below in further detail, the corrosion inhibitor of the present embodiment is used for forming an anticorrosion film on the inner surface of oil extraction tubing or transport piping. During use of oil extraction tubing or transport piping having an anticorrosion film formed on the inner surface by the corrosion inhibitor of the present embodiment, from the viewpoint of minimizing the effect of the component (C) by ensuring that even if the component (C) detaches from the anticorrosion film and becomes mixed with the hydrocarbons, the component (C) is also combusted during combustion of the hydrocarbons, carbon nanotubes, carbon black or graphene is preferred, and carbon nanotubes are particularly desirable.

Examples of the carbon nanotubes include single-walled carbon nanotubes, multi-walled carbon nanotubes, and cup-stacked carbon nanotubes.

Single-walled carbon nanotubes are molecules formed from graphene sheets, and have a hollow cylindrical shape.

Multi-walled carbon nanotubes are molecules formed form multiple layers of graphene sheets, and have a structure in which cylinders of the graphene sheets are layered coaxially.

Cup-stacked carbon nanotubes are carbon fibers having a structure in which a plurality of bottomless cup-shaped nanocarbon structures formed from graphene sheets are stacked in the height direction of the cups, wherein the number of stacked cup-shaped nanocarbon structures is within a range from a few to about several hundred.

Among the various types of carbon nanotubes, cup-stacked carbon nanotubes are particularly preferred as the component (C). As mentioned above, when the component (C) detaches from the anticorrosion film and mixes with the hydrocarbons during use of the oil extraction tubing or transport piping, the component (C) may sometimes contact a valve connected to the tubing or transport piping, causing damage to the valve. Provided cup-stacked carbon nanotubes are used as the component (C), the carbon-shaped nanocarbon structures can readily break apart upon impact with the valve, enabling prevention of any damage to the valve.

The amount of the component (C) in the corrosion inhibitor is preferably from 0.02 to 0.5 parts by mass, and more preferably from 0.06 to 0.3 parts by mass, per 100 parts by mass of the component (B). Provided the amount of the component (C) is at least 0.02 parts by mass, the corrosion prevention effect is enhanced. The corrosion prevention effect tends to improve as the amount of the component (C) is increased, but the effect plateaus once the amount is increased beyond 0.5 parts by mass. If consideration is given to achieving a balance between the corrosion prevention effect and the production costs, then the amount of the component (C) is preferably not more than 0.5 parts by mass.

<Optional Components>

The corrosion inhibitor of the present embodiment may also contain optional components where necessary, provided the effects of the present embodiment are not impaired.

Examples of the optional components include low-molecular weight alcohols (specifically, alcohols of 1 to 10 carbon atoms) such as ethanol. Including a low-molecular weight alcohol in the corrosion inhibitor enhances the dispersibility of the component (A) to water.

<Production Method>

The corrosion inhibitor of the present embodiment can be obtained by mixing the component (A), the component (B), the component (C), and any optional components that may be added as necessary. In terms of facilitating uniform dispersion of the component (C) in the component (B), it is preferable that the component (B) and the component (C) are first mixed together to prepare a dispersion, with the component (A) then being added to this dispersion.

<Actions and Effects>

The corrosion inhibitor of the embodiment described above contains the component (C) in addition to the component (A) and the component (B), and therefore exhibits excellent anticorrosion performance. In particular, the corrosion inhibitor also displays a superior effect on the inner surfaces of pipes that have been wet with water as a result of separation of oil and water, the corrosion of which has proven to be difficult to suppress with current corrosion inhibitors. Accordingly, by using the corrosion inhibitor of the present embodiment, corrosion of the inner surfaces of oil extraction tubing or transport piping can be satisfactorily prevented. The reason that the corrosion inhibitor of the present embodiment exhibits excellent anticorrosion performance is thought to include the following.

When an anticorrosion film is formed by the corrosion inhibitor of the present embodiment, for example on the inner surface of oil extraction tubing, as shown in FIG. 1, oil extraction tubing 10 is obtained in which an anticorrosion film 12 formed by the corrosion inhibitor has been formed on an inner surface 11a of a main body 11. It is thought that this anticorrosion film 12 is formed in the manner described below, as illustrated schematically in FIG. 2.

Figure 2:
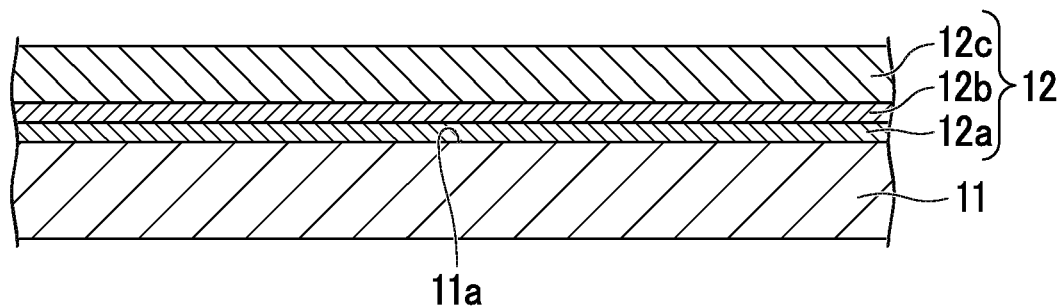
FIG. 2 is a partially enlarged view of FIG. 1.

First, the polar group of the component (A) adsorbs to the inner surface 11a of the main body 11, forming a layer (hereafter referred to as "the A layer") 12a composed mainly of the component (A). The component (B) and the component (C) then intertwine with the hydrophobic groups of the component (A), forming a layer (hereafter referred to as "the B layer") 12b composed mainly of the component (B) and a layer (hereafter referred to as "the C layer") 12c composed mainly of the component (C) on top of the A layer 12a, thus forming the anticorrosion film 12. In FIG. 2, in order to facilitate the description and enable schematic illustration of the anticorrosion film 12, the A layer 12a, the B layer 12b and the C layer 12c are shown as independent layers, but the interfaces between each of these layers are actually not distinct.

In this manner, the polar group of the component (A) adsorbs to the inner surface 11a of the main body 11 to form the A layer 12a, and the component (B) then intertwines with the hydrophobic groups of the component (A), thereby enhancing the anticorrosion effect of the component (A) and realizing superior corrosion prevention. It is thought that by also using the component (C) with this combination of the component (A) and the component (B), the stability is improved and the rustproofing (hydrophobic) effect is further enhanced, thus improving the corrosion prevention properties and enabling favorable prevention of corrosion of the inner surface of the oil extraction tubing or transport piping.

The corrosion inhibitor of the present embodiment is ideal as a corrosion inhibitor for the oil extraction tubing of production wells used for producing petroleum or natural gas or the like, and for the transport piping of pipelines used for transporting petroleum or natural gas, and more specifically, is used for forming an anticorrosion film on the inner surface of the oil extraction tubing or transport piping.

[Well, Pipeline]

A well and a pipeline of embodiments of the present invention contain a carbon steel pipe having an inner surface on which an anticorrosion film has been formed by the corrosion inhibitor of the embodiment described above, either as the oil extraction tubing of the production well or as the transport piping of the pipeline. The "inner surface" is the surface on the inside of the oil extraction tubing or transport piping, and is the surface with which the petroleum or natural gas containing moist corrosive gases makes contact.

The outer surface of the oil extraction tubing or transport piping may also be coated with a coating layer if required.

Examples of the coating layer used for coating the outer surface include a structure in which a primer layer, an adhesive layer and a polyolefin layer are laminated in that order from the outer surface. The primer layer is, for example, formed by an epoxy resin or the like. The polyolefin layer is formed from at least one of polyethylene and polypropylene, and may be composed of a single layer or a plurality of layers.

FIG. 1 is a cross-sectional view illustrating one example of oil extraction tubing contained in a well of the present embodiment. As described above, the oil extraction tubing 10 of this example has an anticorrosion film 12 formed from the corrosion inhibitor on an inner surface 11*a* of a main body 11.

The amount of the component (A) adhered per 1 m$^2$ of the inner surface 11*a* of the main body 11 is preferably within a range from 0.1 to 3 mg.

The amount of the component (B) adhered per 1 m$^2$ of the inner surface 11*a* is preferably within a range from 20 mg to 3 g.

The amount of the component (C) adhered per 1 m$^2$ of the inner surface 11*a* is preferably within a range from 0.4 mg to 0.9 g.

The amounts of the component (A), the component (B) and the component (C) adhered per 1 m$^2$ of the inner surface of a pipeline are similar.

Figure 3:
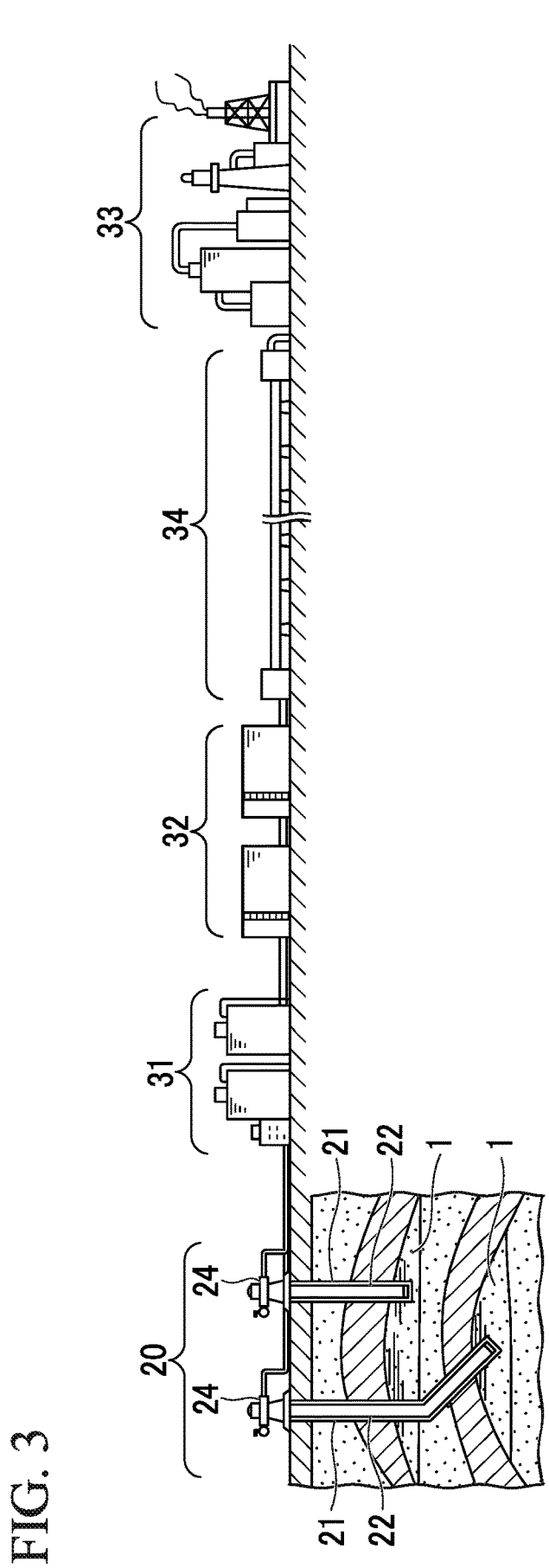
FIG. 3 is a schematic drawing illustrating the various facilities of an oil field used for the production of petroleum.

One example of the method for forming the anticorrosion film 12 on the inner surface 11*a* of piping is described with reference to FIG. 3. FIG. 3 illustrates an oil field facilities used for producing petroleum. The oil field includes a production well 20 that extracts the crude oil from an underground oil layer 1, a separator 31 that separates natural gas and impurities such as underground water from the unprocessed crude oil, an oil storage tank 32 that stores the crude oil from which impurities have been separated, and a pipeline system 34 that transports the crude oil from the oil storage tank 32 to a processing facility 33.

Figure 4:
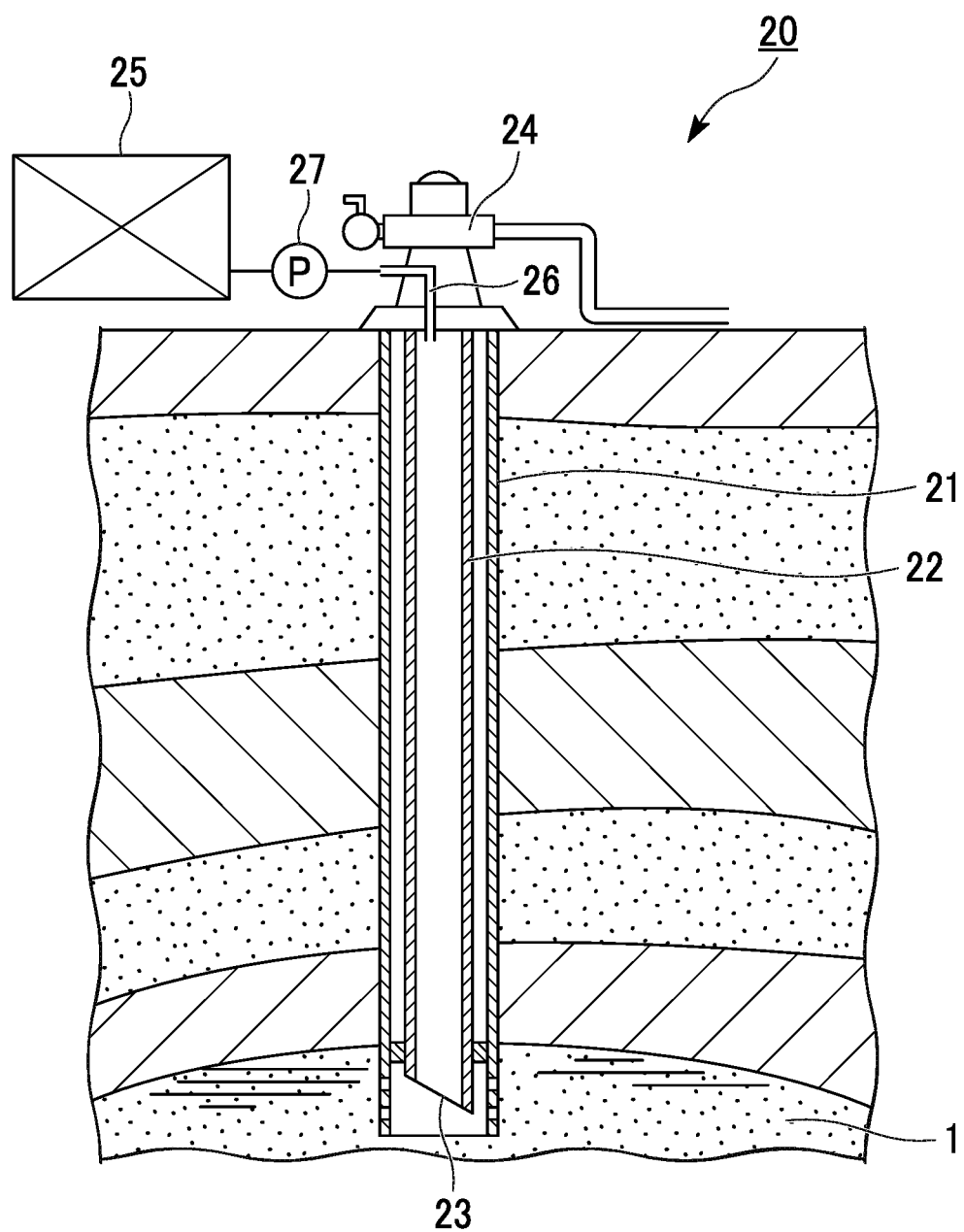
FIG. 4 is a schematic drawing illustrating one example of the production well of FIG. 3.

FIG. 4 illustrates the structure of mainly the production well 20 of the oil field. The production well 20 contains a cylindrical casing 21 that reaches down to the oil layer 1, and tubing 22 that functions as the oil extraction tubing that is passed through the inside of the casing 21. A plurality of small holes are formed in the surface of the wall at the bottom end of the casing 21.

An entry guide 23 for guiding the production fluid into the tubing 22 is connected to the bottom end of the tubing 22 that reaches the oil layer 1. A well-head assembly 24 including equipment (not shown in the drawing) such as a valve, a pressure gauge, a thermometer and a blowout prevention device is attached to the top end portion of the tubing 22 which is exposed above ground.

A tank 25 for introducing the corrosion inhibitor of the present invention is connected to the well-head assembly 24. The tank 25 is connected to the tubing 22 via an injection pipe 26. The injection pipe 26 is provided with a pump 27 that supplies the corrosion inhibitor under pressure to the inside of the tubing 22.

The crude oil that exists in the oil layer 1 flows from the entry guide 23 into the inside of the tubing 22. When the pressure of the oil layer 1 is high, the crude oil gushes out of the well through the tubing 22, but when the pressure of the oil layer 1 is low, the crude oil is pumped to the surface using a bucket pump or the like not shown in the drawing. The crude oil extracted from the oil layer 1 through the tubing 22 is transported to the separator 31 via the well-head assembly 24, impurities are separated, and following temporary storage in the oil storage tank 32, the crude oil is transported through the pipeline system 34 to the processing facility 33.

Examples of the method used for forming the anticorrosion film of the corrosion inhibitor on the inner surface of the tubing 22 include a method that is performed while production of the crude oil is temporarily halted, and a method that is performed while production of the crude oil is continued.

First, in the method for forming the anticorrosion film while production of the crude oil is temporarily halted, the valve of the well-head assembly 24 is closed, and the inside of the tubing 22, with the exception of the entry guide 23 at the tip of the tubing, becomes a closed space. This closed space inside the tubing 22 is sealed from the extracted crude oil, including natural gas, underground water and corrosive gases such as carbon dioxide and hydrogen sulfide. With this state maintained, the pump 27 is activated, and the corrosion inhibitor is injected into the inside of the tubing 22. In a production well in which the pressure of the oil layer 1 is high and the crude oil is gushing naturally, the tubing 22 is kept sealed while the corrosion inhibitor is injected into the inside of the tubing 22 at a pressure higher than that of the oil layer 1.

In a production well in which the pressure of the oil layer 1 is low and the crude oil is no longer gushing naturally, the corrosion inhibitor may be simply supplied to the inside of the tubing 22 with the valve of the well-head assembly 24 closed.

The corrosion inhibitor supplied to the inside of the tubing 22 flows down the inside of the tubing 22, and during that process, the aforementioned components (A), (B) and (C) adhere to the inner surface of the tubing 22, forming the anticorrosion film 12 composed of the A layer, the B layer and the C layer illustrated in FIG. 1.

Figure 5:
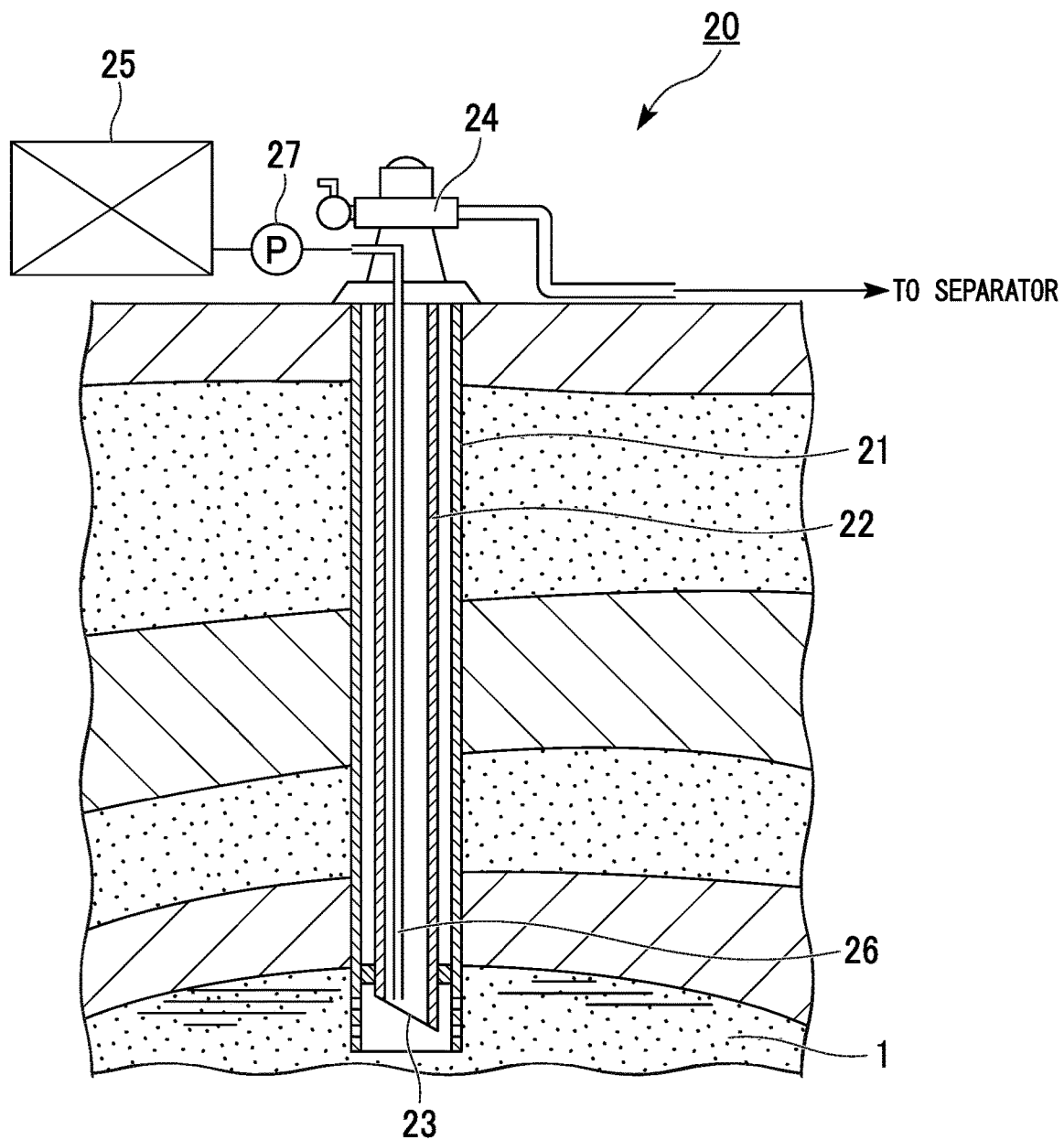
FIG. 5 is a schematic drawing illustrating another example of the production well of FIG. 3.

Next, in the method for forming the anticorrosion film inside the tubing 22 while production of the crude oil is continued, an injection tube (capillary tube) 26 having sufficient length to reach the entry guide 23 is inserted into the tubing 22 as illustrated in FIG. 5, and the pump 27 is then activated as required to supply the corrosion inhibitor to the inside of the tubing 22.

The corrosion inhibitor is injected from the tip of the injection tube 26 that reaches the entry guide 23 into the inside of the tubing 22, and flows up the inside of the tubing 22 together with the crude oil flowing from the oil layer 1 to the surface, and during that process, the components (A), (B) and (C) adhere to the inner surface of the tubing 22, forming the anticorrosion film 12 composed of the A layer, the B layer and the C layer illustrated in FIG. 1.

By using the above methods, the anticorrosion film 12 can also be formed on the inner surface of existing tubing 22 inside a production well.

In the case of forming an anticorrosion film on the inner surface of a pipeline, formation may be conducted, for example, in the manner described below.

Figure 6:
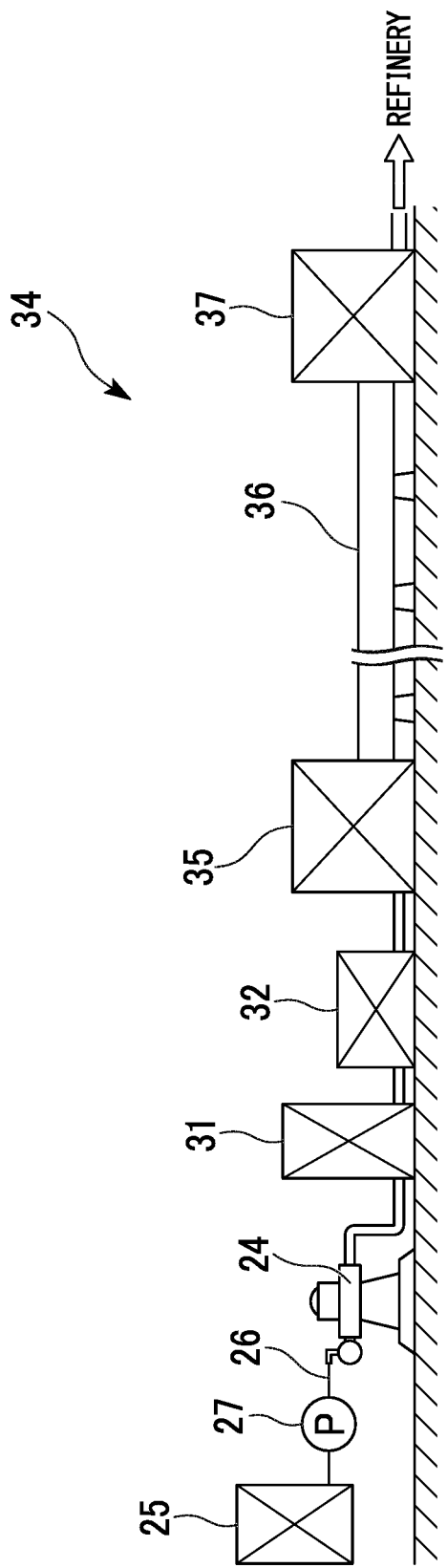
FIG. 6 is a schematic drawing illustrating one example of the pipeline system of FIG. 3.

FIG. 6 illustrates the pipeline system 34 that transports crude oil from the well-head assembly 24 through the separator 31 and the oil storage tank 32 to the processing facility 33. The pipeline system 34 includes a pressure feed facility 35 that force-feeds the crude oil stored temporarily in the oil storage tank toward an oil refinery, a pipeline 36 to which a plurality of transport pipes are connected, and a receiving facility 37 at the refinery that receives the crude oil that has been force-fed through the pipeline 36.

On the other hand, the tank 25 for introducing the corrosion inhibitor is connected to the well-head assembly 24. The tank 25 is connected to the well-head assembly 24 via the injection pipe 26, and is connected to the pipeline 36 via the separator 31 and the oil storage tank 32. The injection pipe 26 is provided with a pump 27 that supplies the corrosion inhibitor under pressure to the inside of the pipeline 36 via the well-head assembly 24.

When forming an anticorrosion film by the corrosion inhibitor on the inner surface of the pipeline 36, by activating the pump 27 and injecting the corrosion inhibitor into the inside of the pipeline 36 through the well-head assembly 24, the corrosion inhibitor flows through the inside of the pipeline 36 together with the crude oil, and during that process, the aforementioned components (A), (B) and (C) adhere to the inner surface of the pipeline 36, forming the anticorrosion film 12 composed of the A layer, the B layer and the C layer illustrated in FIG. 1.

By using the above method, the anticorrosion film 12 can also be formed on the inner surface of the transport piping of an existing pipeline 36.

The well and pipeline of the embodiments described above have an anticorrosion film formed by the corrosion inhibitor of the present invention formed on the inner surface of the tubing and the pipeline respectively, and are therefore resistant to corrosion.

EXAMPLES

The present invention is described below in further detail using a series of examples, but the present invention is in no way limited by these examples.

Test 1

Example 1

Figure 7:
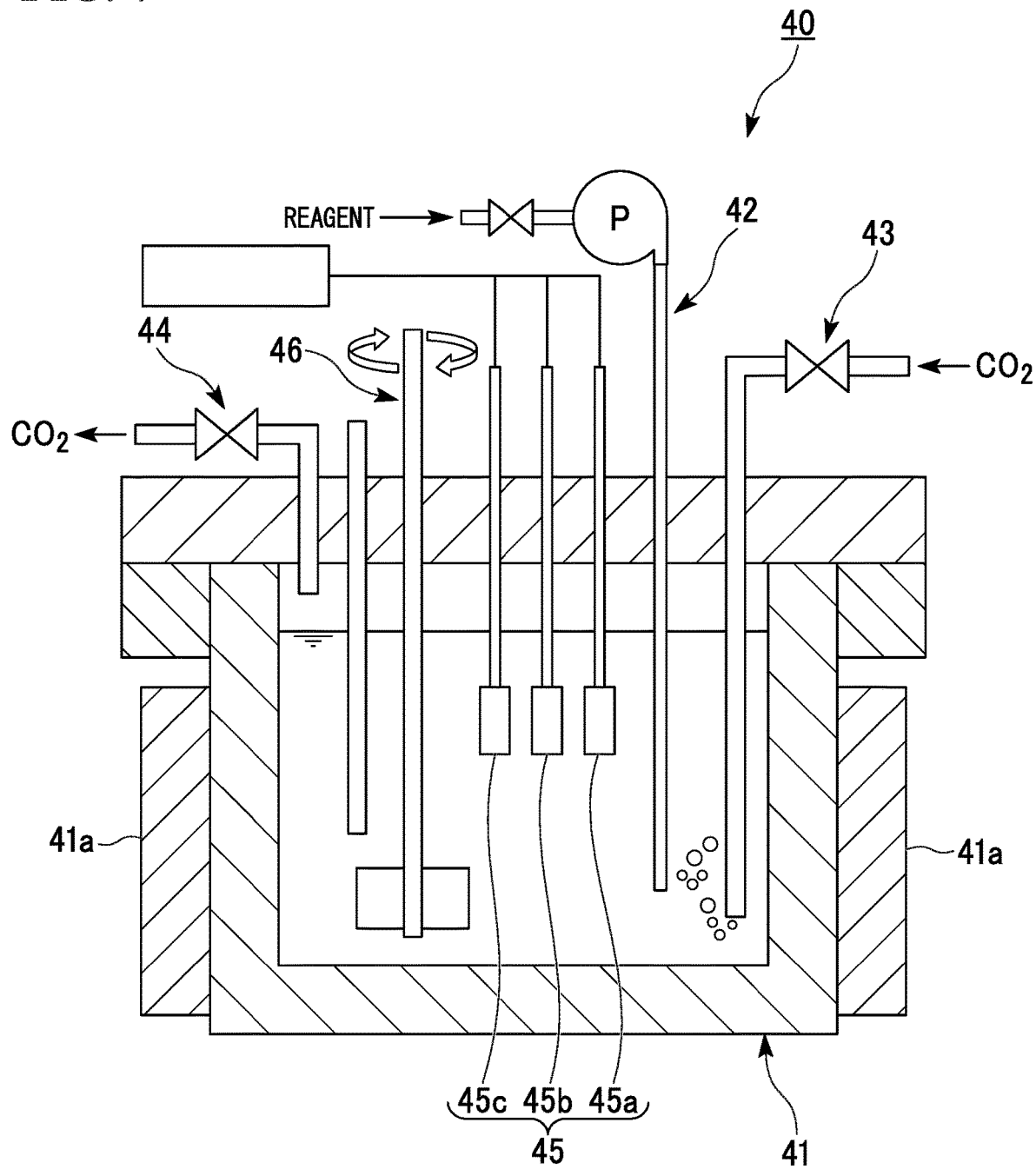
FIG. 7 is a schematic drawing illustrating an apparatus used in Tests 1 to 4 for measuring the corrosion rate.

The corrosion rate was measured using an apparatus 40 illustrated in FIG. 7.

The apparatus 40 illustrated in FIG. 7 is equipped with a sealable corrosion-resistant and pressure-resistant container (autoclave) 41 with a capacity of 2.3 L, an addition device 42 for adding reagents to the pressure-resistant container 41, an injection device 43 for injecting a gas such as carbon dioxide into the pressure-resistant container 41, a discharge device 44 for discharging gas from the pressure-resistant container 41, electrodes 45, and a stirring device 46.

A heater 41a is attached around the outer periphery of the pressure-resistant container 41, and is able to maintain a solution housed inside the pressure-resistant container 41 at a constant temperature.

The electrodes 45 include a reference electrode 45a, a working electrode 45b, and a counter electrode 45c. In this example, carbon steel electrodes were used for the reference electrode 45a and the working electrode 45b, and platinum was used for the counter electrode 45c.

First, 1.8 L of water separated from crude oil produced in Akita prefecture was introduced into the pressure-resistant container 41, the container was sealed, and with the temperature held at 40° C. and the water undergoing stirring with the stirring device 46, carbon dioxide was injected from the injection device 43 until the partial pressure of carbon dioxide within the water reached $1 \times 10^4$ Pa.

A small electric current was passed between the reference electrode 45a and the working electrode 45b, the potential difference between the electrodes was controlled at a specific preset potential (10 mV), and the current density flowing between the working electrode 45b and the counter electrode 45c was measured. Control of the potential was performed by sweeping at a prescribed potential sweep rate from the corrosion potential to the anodic side.

Based on the obtained potential-current density results, the corrosion rate was determined using the polarization resistance method. This rate was deemed the blank corrosion rate ($r_0$). The blank corrosion rate ($r_0$) was 6 mpy.

Sixty minutes after measurement of the current density, a corrosion inhibitor composed of a mixture of the component (A), the component (B) and the component (C) was added from the addition device 42, and the corrosion rate ($r_1$) was measured over time in the same manner as described above.

Figure 8:
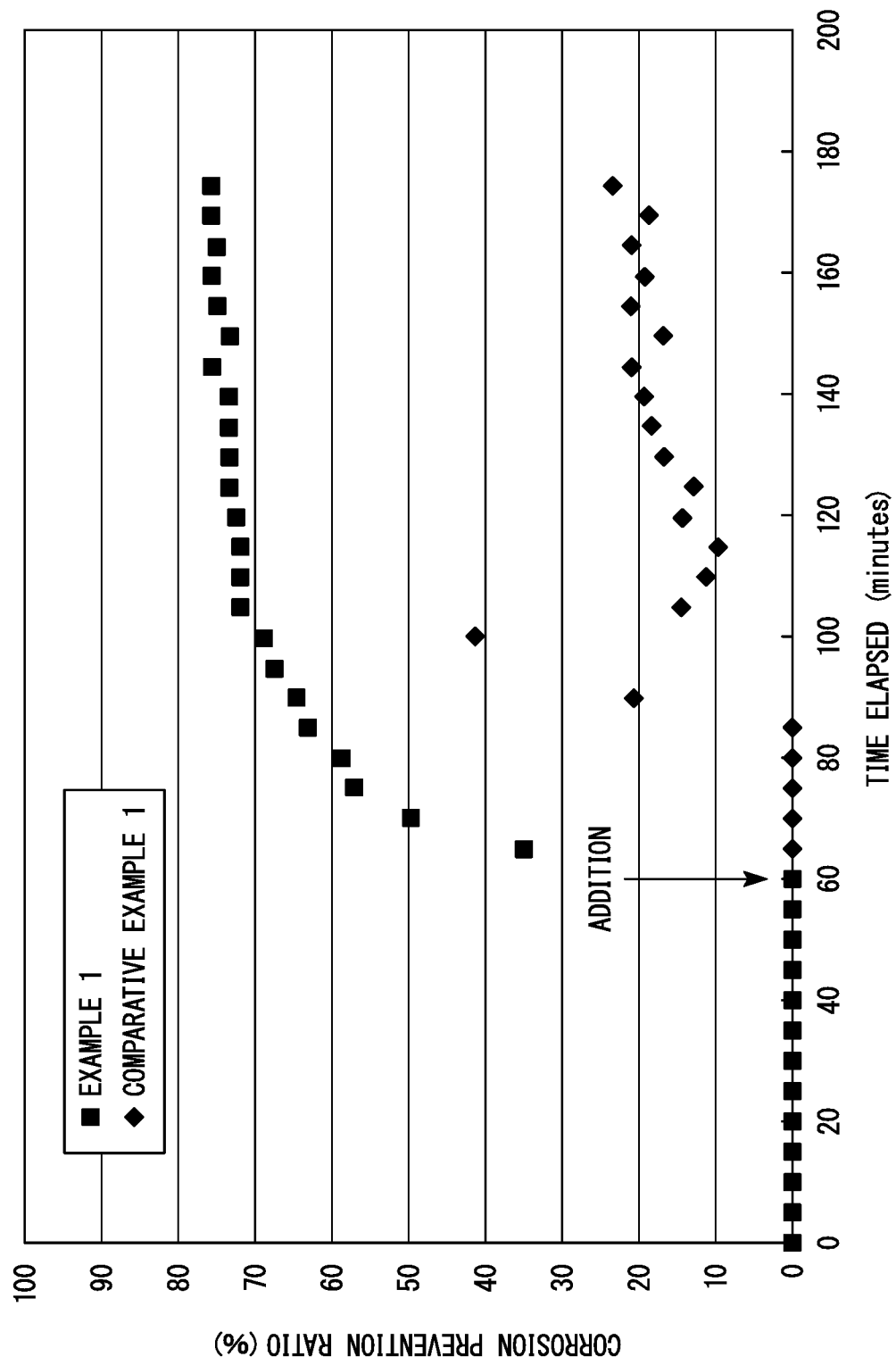
FIG. 8 is a graph illustrating the results (corrosion prevention ratio) of Test 1.

The corrosion prevention ratio for the blank (namely, prior to addition of the corrosion inhibitor) was deemed to be 0%, and then using the corrosion rate ($r_0$) and the corrosion rate ($r_1$), the corrosion prevention ratio following addition of the corrosion inhibitor was determined using the formula (1) shown below. The results are shown in FIG. 8.

$$\text{Corrosion prevention ratio (\%)} = (r_0 - r_1)/r_0 \times 100 \quad (1)$$

A water-soluble inhibitor (EC1304A, manufactured by Nalco Champion Co., Ltd.) was used as the component (A), xylene was used as the component (B), and cup-stacked carbon nanotubes (Carbere, manufactured by GSI Creos Corporation) were used as the component (C). The amounts added of these components, per 1.8 L of the water from Akita prefecture inside the pressure-resistant container 41, were 25 ppm for the component (A), 2 mL for the component (B), and 6 mg for the component (C) respectively. In other words, 4,000 parts by mass of the component (B) were used per 100 parts by mass of the component (A), and 0.38 parts by mass of the component (C) were used per 100 parts by mass of the component (B).

Comparative Example 1

With the exception of adding only the component (A) instead of the corrosion inhibitor (the mixture of (A), (B), and (C)), the corrosion prevention ratio was determined in the same manner as Example 1. The results are shown in FIG. 8.

The water-soluble inhibitor (EC1304A, manufactured by Nalco Champion Co., Ltd.) was used as the component (A), and the amount added of the component (A) was 25 ppm relative to the 1.8 L of the water from Akita prefecture inside the pressure-resistant container 41.

As is evident from the results in FIG. 8, in the case of Example 1, by adding the corrosion inhibitor, the corrosion prevention ratio increased to about 75% compared with the case prior to addition of the corrosion inhibitor (the blank).

On the other hand, in Comparative Example 1, although the corrosion prevention ratio increased to some extent (about 20%) by adding the component (A), the result was inferior to that observed in Example 1.

Test 2

Example 2

First, 1.8 L of water separated from crude oil produced in Niigata prefecture was introduced into the pressure-resistant container 41, the container was sealed, and with the temperature held at 80° C. and the water undergoing stirring with the stirring device 46, carbon dioxide was injected from the injection device 43 until the partial pressure of carbon dioxide within the water reached $1\times10^4$ Pa, and the blank corrosion rate ($r_0$) was measured in the same manner as Example 1. The blank corrosion rate ($r_0$) was 99 mpy.

Figure 9:
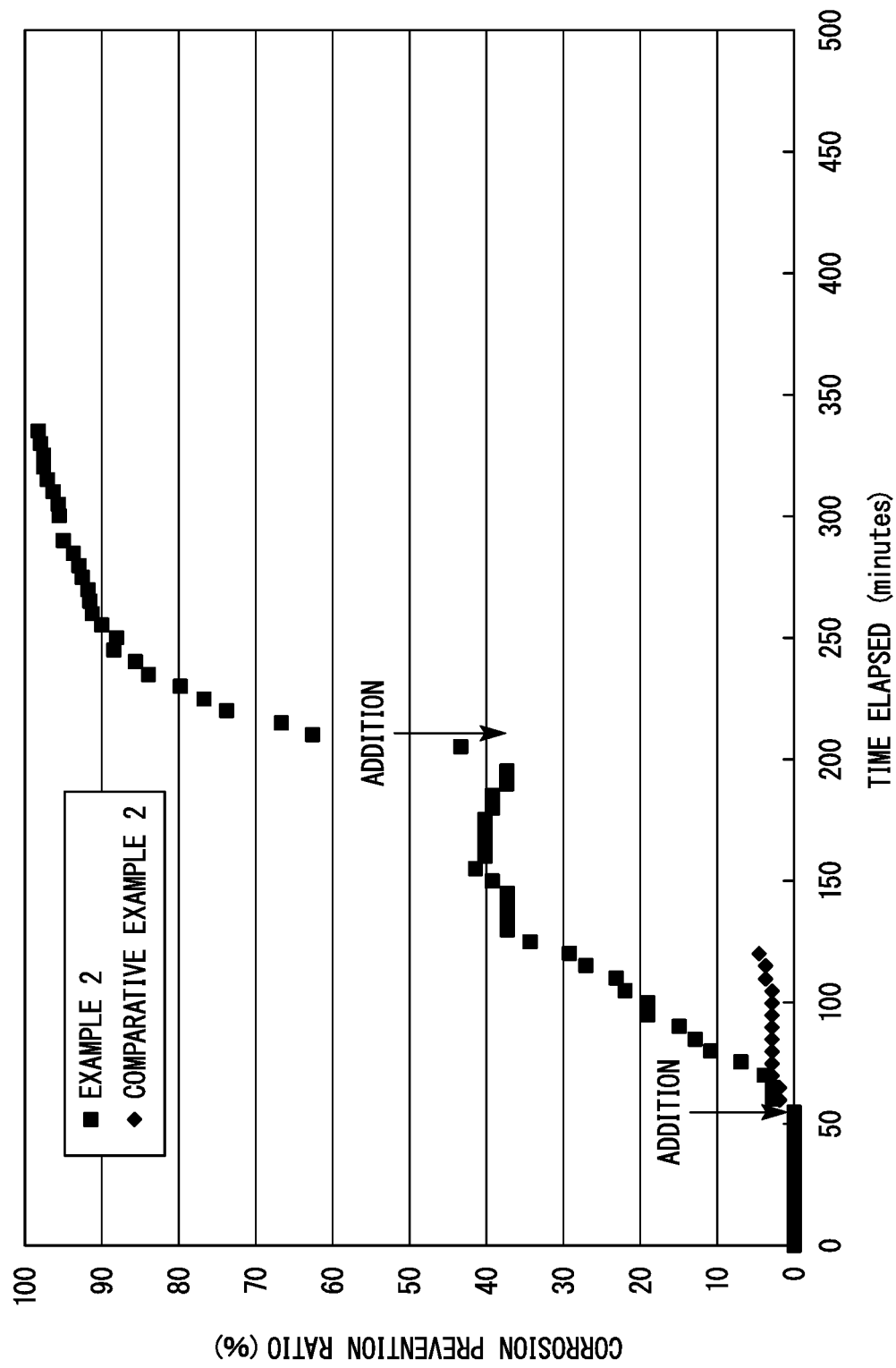
FIG. 9 is a graph illustrating the results (corrosion prevention ratio) of Test 2.

Fifty five minutes after measurement of the current density, a corrosion inhibitor composed of a mixture of the component (A), the component (B) and the component (C) was added from the addition device 42, and the corrosion rate was measured in the same manner as Example 1. The results are shown in FIG. 9.

An oil-soluble, water-dispersible inhibitor (EC1103A, manufactured by Nalco Champion Co., Ltd.) was used as the component (A), xylene was used as the component (B), and cup-stacked carbon nanotubes (Carbere, manufactured by GSI Creos Corporation) were used as the component (C). The amounts added of these components, per 1.8 L of the water from Niigata prefecture inside the pressure-resistant container 41, were 150 ppm for the component (A), 5 mL for the component (B), and 3 mg for the component (C) respectively. In other words, 1,850 parts by mass of the component (B) were used per 100 parts by mass of the component (A), and 0.08 parts by mass of the component (C) were used per 100 parts by mass of the component (B).

Subsequently, 210 minutes after measurement of the current density, a dispersion containing 3 mg of the component (C) dispersed in water was added from the addition device 42, and the corrosion prevention ratio was determined in the same manner as described above. The results are shown in FIG. 9. In other words, 0.15 parts by mass of the component (C) were added per 100 parts by mass of the component (B).

Comparative Example 2

With the exception of adding only the component (A) instead of the corrosion inhibitor (the mixture of (A), (B), and (C)), the corrosion prevention ratio was determined in the same manner as Example 2. The results are shown in FIG. 9.

The oil-soluble, water-dispersible inhibitor (EC1103A, manufactured by Nalco Champion Co., Ltd.) was used as the component (A), and the amount added of the component (A) was 150 ppm relative to the 1.8 L of the water from Niigata prefecture inside the pressure-resistant container 41.

As is evident from the results in FIG. 9, in the case of Example 2, by adding the corrosion inhibitor, the corrosion prevention ratio increased to about 40% compared with the case prior to addition of the corrosion inhibitor (the blank). By adding additional component (C), the corrosion prevention ratio was increased to about 99%.

On the other hand, in Comparative Example 2, although the corrosion prevention ratio increased to some extent by adding the component (A), the result was inferior to that observed in Example 2.

These results indicated that almost no corrosion prevention effect on the water phase was achieved using a commercially available oil-soluble, water-dispersible inhibitor (corrosion prevention ratio of about 5%), whereas the corrosion inhibitor of the present invention was able to exhibit an extremely powerful suppression effect.

Test 3

Test Example 1

To 500 mL of an aqueous solution of sodium chloride having a concentration of 1% by mass was added sufficient sodium bicarbonate to obtain a concentration of 400 mg/L, and hydrochloric acid was then added in an amount sufficient to achieve a pH at room temperature of 3.9, thus completing preparation of a test water.

The pressure-resistant container 41 of the apparatus 40 used in Example 1 was replaced with a glass cell, the entire amount of the prepared test water was placed in the glass cell, and with the water being stirred in an open state, the blank corrosion rate ($r_0$) was measured in the same manner as Example 1. The blank corrosion rate ($r_0$) was 38 mpy.

In a separate measurement, a similar amount of the test water was placed in a glass cell, and sodium N-dodecanoyl-sarcosinate was added as the component (A) in an amount sufficient to obtain a concentration of $5\times10^{-4}$ mol/L. With the water being stirred in an open state, the corrosion rate ($r_1$) was measured.

The corrosion prevention ratio for the blank (namely, prior to addition of the corrosion inhibitor) was deemed to be 0%, and the corrosion prevention ratio was determined in the same manner as Example 1. The results are shown in FIG. 10.

Next, 0.5 mL of xylene was added as the component (B) to the test water containing the added component (A). With the water being stirred in an open state, the corrosion rate ($r_1$) was measured, and the corrosion prevention ratio was determined.

Figure 10:
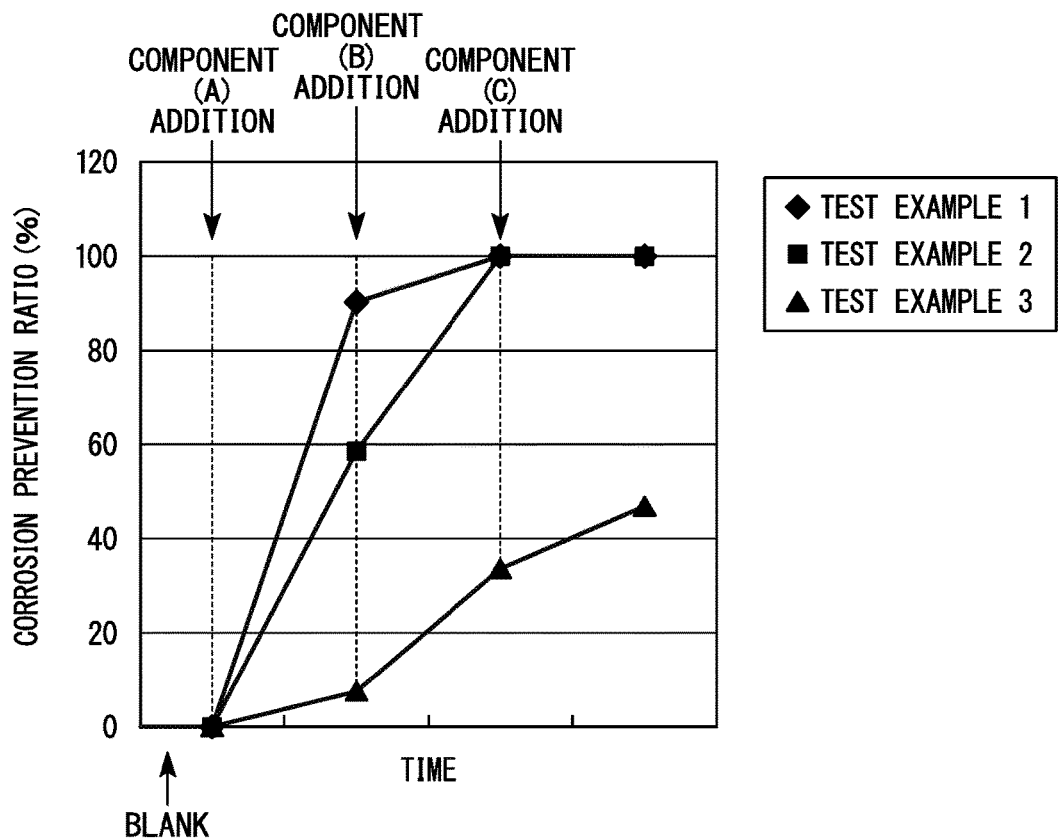
FIG. 10 is a graph illustrating the results (corrosion prevention ratio) of Test 3.

The results are shown in FIG. 10.

Subsequently, 1.3 mg of cup-stacked carbon nanotubes (Carbere, manufactured by GSI Creos Corporation) as the component (C) was added to the test water containing the added component (A) and component (B). With the water being stirred in an open state, the corrosion rate ($r_1$) was measured, and the corrosion prevention ratio was determined. The results are shown in FIG. 10.

In Test Example 1, 550 parts by mass of the component (B) were used per 100 parts by mass of the component (A), and 0.3 parts by mass of the component (C) were used per 100 parts by mass of the component (B).

Test Example 2

With the exception of using dodecylamine as the component (A), the same procedure as Test Example 1 was used to determine the corrosion prevention ratio upon addition of each of the components. The results are shown in FIG. 10.

Test Example 3

With the exception of using stearic acid as the component (A), the same procedure as Test Example 1 was used to determine the corrosion prevention ratio upon addition of each of the components. The results are shown in FIG. 10.

As is evident from the results in FIG. 10, the corrosion prevention ratio increased as the component (A), the component (B) and the component (C) were added sequentially to the test water. In other words, the corrosion prevention ratio was highest when all three of the component (A), the component (B) and the component (C) had been added to the test water.

In the case of Test Examples 1 and 2, the difference between the corrosion prevention ratio when the component (B) was added and the corrosion prevention ratio when the component (C) was also added is difficult to ascertain from the results in FIG. 10 due to the scale used in the graph, and therefore the corrosion prevent effect was investigated on the basis of the corrosion rate.

Figure 11:
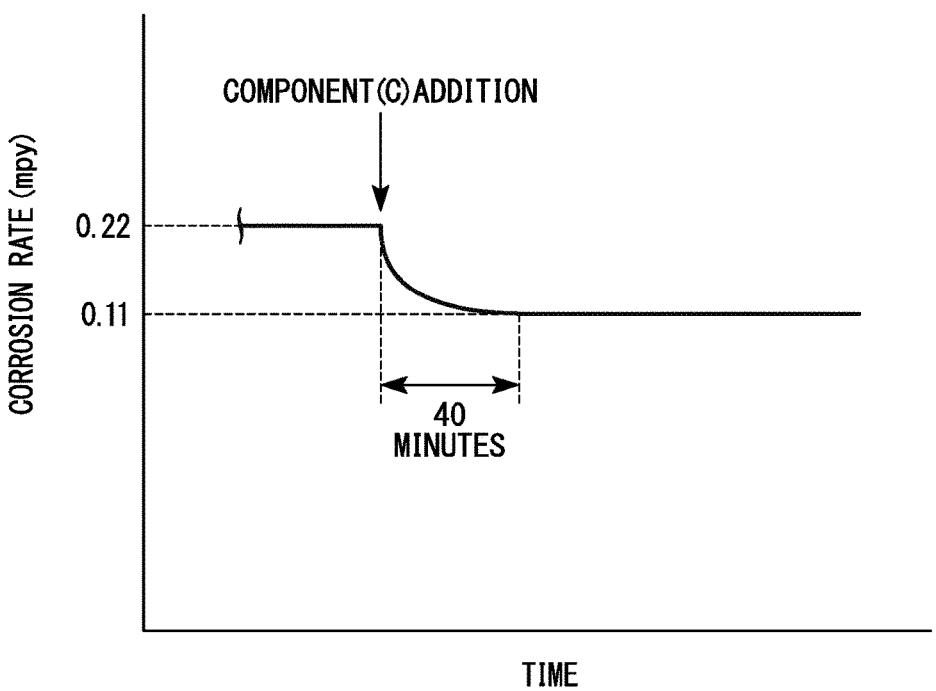
FIG. 11 is a graph illustrating the results (corrosion rate) for Test Example 1 in Test 3.

FIG. 11 is a graph showing the results for the corrosion rate in Test Example 1 when the component (B) was added, and when the component (C) was added.

As is evident from the results in FIG. 11, the corrosion rate when the component (B) was added to the test water containing the added component (A) was 0.22 mpy. The corrosion prevention ratio at this point was 99.4%.

The component (C) was then added, and the corrosion rate 40 minutes after the addition was 0.11 mpy. The corrosion prevention ratio at this point was 99.7%.

In this manner, addition of the component (C) to the test water containing the component (A) and the component (B) caused the corrosion rate to be reduced by half. This means that by adding the component (C) to a combination of the component (A) and the component (B), superior corrosion prevention was able to be achieved.

Test 4

Test Example 4

To 500 mL of an aqueous solution of sodium chloride having a concentration of 1% by mass was added sufficient sodium bicarbonate to obtain a concentration of 400 mg/L, and hydrochloric acid was then added in an amount sufficient to achieve a pH at room temperature of 3.9, thus completing preparation of a test water.

The pressure-resistant container 41 of the apparatus 40 used in Example 1 was replaced with a glass cell, the entire amount of the prepared test water was placed in the glass cell, and with the water being stirred in an open state, the blank corrosion rate ($r_0$) was measured in the same manner as Example 1. The blank corrosion rate ($r_0$) was 38 mpy.

In a separate measurement, a similar amount of the test water was placed in a glass cell, and dodecylamine was added as the component (A) in an amount sufficient to obtain a concentration of $2 \times 10^{-4}$ mol/L. With the water being stirred in an open state, the corrosion rate ($r_1$) was measured.

The corrosion prevention ratio for the blank (namely, prior to addition of the corrosion inhibitor) was deemed to be 0%, and the corrosion prevention ratio was determined in the same manner as Example 1. The results are shown in FIG. 12.

Next, 0.7 mL of xylene was added as the component (B) to the test water containing the added component (A). With the water being stirred in an open state, the corrosion rate ($r_1$) was measured, and the corrosion prevention ratio was determined.

Figure 12:
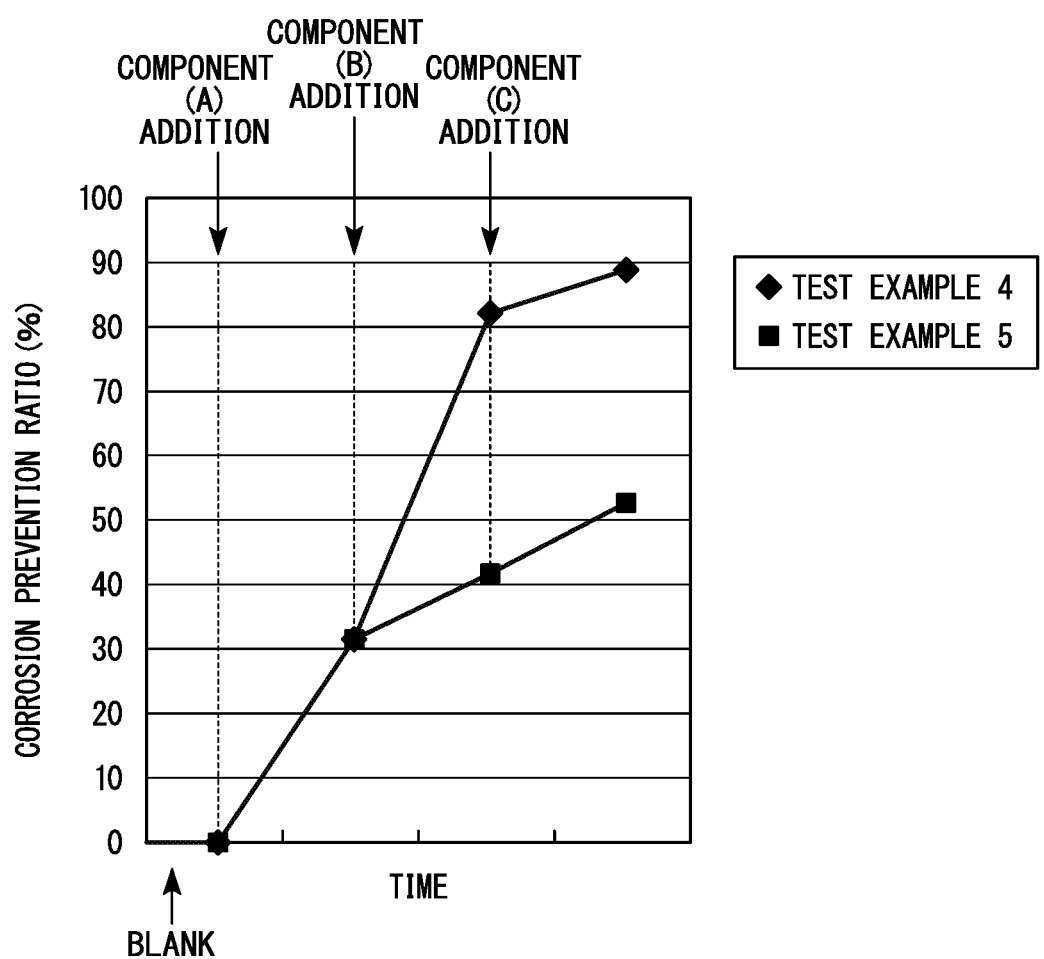
FIG. 12 is a graph illustrating the results (corrosion prevention ratio) of Test 4.

The results are shown in FIG. 12.

Subsequently, 1.6 mg of cup-stacked carbon nanotubes (Carbere, manufactured by GSI Creos Corporation) as the component (C) was added to the test water containing the added component (A) and component (B). With the water being stirred in an open state, the corrosion rate ($r_1$) was measured, and the corrosion prevention ratio was determined. The results are shown in FIG. 12.

In Test Example 4, 1,500 parts by mass of the component (B) were used per 100 parts by mass of the component (A), and 0.3 parts by mass of the component (C) were used per 100 parts by mass of the component (B).

Test Example 5

With the exception of using a polycyclic aromatic hydrocarbon (Solvesso 100, manufactured by Exxon Mobil Corporation, initial boiling point: 161° C., end point: 179° C.) as the component (B), the same procedure as Test Example 4 was used to determine the corrosion prevention ratio upon addition of each of the components. The results are shown in FIG. 12.

As is evident from the results in FIG. 12, the corrosion prevention ratio increased as the component (A), the component (B) and the component (C) were added sequentially to the test water. In other words, the corrosion prevention ratio was highest when all three of the component (A), the component (B) and the component (C) had been added to the test water. In particular, Test Example 4 in which the monocyclic aromatic hydrocarbon xylene was used exhibited a higher corrosion prevention ratio than Test Example 5 in which a polycyclic aromatic hydrocarbon was used.

DESCRIPTION OF THE REFERENCE SIGNS

10: Oil extraction tubing
11: Main body
12: Anticorrosion film
20: Production well
22: Tubing (oil extraction tubing)
23: Entry guide
34: Pipeline system
36: Pipeline (transport piping)

The invention claimed is:

1. A corrosion inhibitor comprising:
   an inhibitor (A) which is N-dodecanoylsarcosinate, oleic imidazoline, or a combination thereof;
   an aromatic solvent (B); and
   hydrophobic nanoparticles (C).

2. The corrosion inhibitor according to claim 1, wherein a boiling point of the aromatic solvent (B) is from 60 to 200° C.

3. The corrosion inhibitor according to claim 2, wherein the hydrophobic nanoparticles (C) are carbon nanotubes.

4. The corrosion inhibitor according to claim 3, wherein the carbon nanotubes are cup-stacked carbon nanotubes.

5. The corrosion inhibitor according to claim 1, wherein the hydrophobic nanoparticles (C) are carbon nanotubes.

6. The corrosion inhibitor according to claim 5, wherein the carbon nanotubes are cup-stacked carbon nanotubes.

7. A well comprising tubing having an anticorrosion film formed on an inner surface of the tubing by the corrosion inhibitor according to claim 1.

8. A pipeline comprising transport piping having an anticorrosion film formed on an inner surface of the transport piping by the corrosion inhibitor according to claim 1.

9. A method for forming an anticorrosion film, the method comprising:
   forming an anticorrosion film on an inner surface of a pipe by adding the corrosion inhibitor according to claim 1 to a hydrocarbon oil or production fluid inside the pipe.

10. The method for forming an anticorrosion film according to claim 7, wherein the pipe is tubing installed in a well, or transport piping in a pipeline.

* * * * *